(12) United States Patent
Gallery et al.

(10) Patent No.: US 10,209,522 B2
(45) Date of Patent: Feb. 19, 2019

(54) HELMET MOUNTED DISPLAY

(71) Applicant: NUVIZ, Inc., San Diego, CA (US)

(72) Inventors: Nathaniel Philip Gallery, San Diego, CA (US); Malte Laass, San Diego, CA (US); Brian Ballard, Herndon, VA (US); Wonjae Kim, Arlington, VA (US); Nicholas Pennycooke, Herndon, VA (US); Jeff Jenkins, Clarksburg, MD (US); William Bleha, Jr., San Diego, CA (US); Jari Niemela, San Diego, CA (US)

(73) Assignee: Nuviz, Inc., San Diego, CA (US)

( * ) Notice: Subject to any disclaimer, the term of this patent is extended or adjusted under 35 U.S.C. 154(b) by 0 days.

(21) Appl. No.: 15/645,734

(22) Filed: Jul. 10, 2017

(65) Prior Publication Data

US 2018/0095280 A1    Apr. 5, 2018

Related U.S. Application Data

(63) Continuation of application No. 14/720,587, filed on May 22, 2015, now Pat. No. 9,726,889.

(60) Provisional application No. 62/002,455, filed on May 23, 2014.

(51) Int. Cl.
| | |
|---|---|
| *G02B 27/01* | (2006.01) |
| *A42B 3/04* | (2006.01) |
| *A42B 3/30* | (2006.01) |
| *G02B 27/10* | (2006.01) |

(Continued)

(52) U.S. Cl.
CPC .......... *G02B 27/0172* (2013.01); *A42B 3/042* (2013.01); *A42B 3/30* (2013.01); *G02B 27/0176* (2013.01); *G02B 27/10* (2013.01); *G02B 27/283* (2013.01); *H04N 5/225* (2013.01)

(58) Field of Classification Search
CPC .......... G02B 23/125; G02B 2027/0156; G02B 27/0149; G06F 3/016; G06F 13/409; G06F 3/0304
See application file for complete search history.

(56) References Cited

U.S. PATENT DOCUMENTS

| | | |
|---|---|---|
| 5,646,783 A | 7/1997 | Banbury |
| 6,034,653 A | 3/2000 | Robertson et al. |
| 7,019,715 B1 | 3/2006 | Kasai et al. |

(Continued)

FOREIGN PATENT DOCUMENTS

| | | |
|---|---|---|
| EP | 2944999 A1 | 11/2015 |
| JP | 2006209144 A | 8/2006 |
| JP | 2007336166 A | 12/2007 |

*Primary Examiner* — Gerald Johnson
(74) *Attorney, Agent, or Firm* — Mintz Levin Cohn Ferris Glovsky and Popeo, P.C.

(57) ABSTRACT

An apparatus having a mounting system and a helmet mounted display. The mounting system including a mounting plate and a mounting rocker. The helmet mounted display including a housing; latching tabs; an optical element having a combiner surface; at least one processor; and at least one memory including software, the at least one memory and software configured to, with the at least one processor, cause the apparatus at least to display heads up information on the combiner surface. The optical element is housed within a second portion of the housing being hingedly attached to the first portion of the housing. The apparatus is configured such that the combiner surface is positionable within the field of view of a wearer of the helmet. Related assemblies and methods are described.

28 Claims, 16 Drawing Sheets

(51) Int. Cl.
*H04N 5/225* (2006.01)
*G02B 27/28* (2006.01)

(56) References Cited

U.S. PATENT DOCUMENTS

| | | |
|---|---|---|
| 2006/0174401 A1 | 8/2006 | Prendergast |
| 2007/0235634 A1 | 10/2007 | Ottney et al. |
| 2010/0254017 A1 | 10/2010 | Martins |
| 2012/0002046 A1 | 1/2012 | Rapoport et al. |
| 2015/0338659 A1 | 11/2015 | Gallery et al. |
| 2016/0085077 A1 | 3/2016 | Milea et al. |

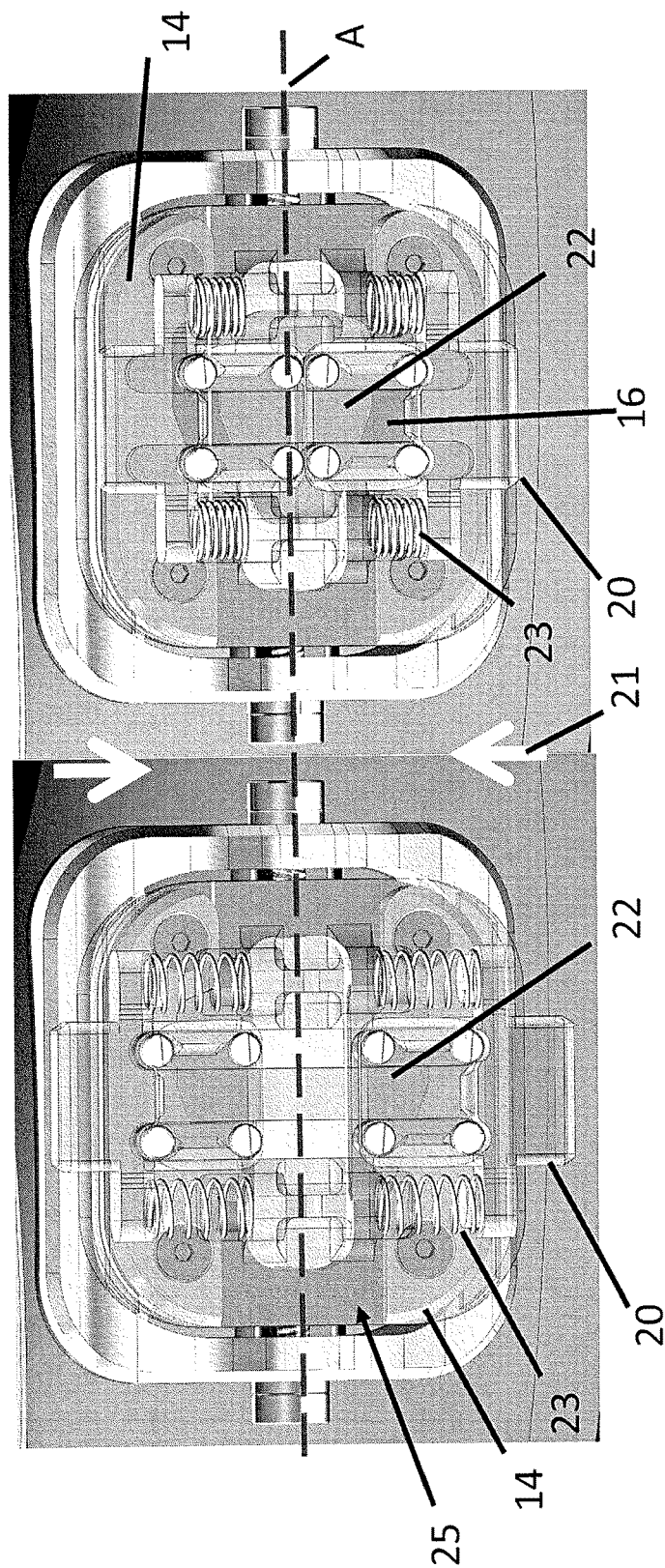

HELMET MOUNTED DISPLAY

CROSS REFERENCE TO PRIORITY DOCUMENT

This application is a continuation of co-pending U.S. application Ser. No. 14/720,587, filed May 22, 2015, and entitled "Helmet Mounted Display" of which claims the benefit of priority to U.S. Provisional Application Ser. No. 62/002,455, filed May 23, 2014, the full disclosures are incorporated by reference herein in their entireties.

FIELD

The subject matter described herein relates to devices that can be mounted to protective helmets, more particularly to form factor configuration of mountable device and to helmet mounted displays known as HMDs.

BACKGROUND

Helmet mounted displays (HMDs) have been used on military aircraft pilot helmets. However, they are generally purpose-built for use in custom helmets and are incredibly expensive.

SUMMARY

In one aspect, provided is an apparatus having a mounting system and a helmet mounted display. The mounting system includes a mounting plate having a first face configured for attachment to a helmet and a mounting rocker having a hinged attachment to a second face of the mounting plate. The mounting rocker includes latch receiver components. The helmet mounted display includes a housing; latching tabs located on a first portion of the housing, the latching tabs detachably attachable to the latch receiver components of the mounting rocker; an optical element having a combiner surface; at least one processor; and at least one memory including software, the at least one memory and software configured to, with the at least one processor, cause the apparatus at least to display heads up information on the combiner surface. The optical element is housed within a second portion of the housing, the second portion of the housing being hingedly attached to the first portion of the housing. The apparatus is configured such that the combiner surface is positionable within the field of view of a wearer of the helmet.

The optical element can further include at least one light emitting diode backlight, at least one lens, at least one polarizing beam splitter, at least one collimator, at least one polarization conversion system and at least one microdisplay surface. The at least one processor and at least one memory including software can be further configured to receive the heads up information from at least one of a cell phone and a vehicle data bus. The heads up information can include at least one of navigation information, weather information, text messages, and vehicle data. The apparatus can further include a camera. The apparatus can be configured to record video from the camera. The mounting plate can be mounted on an outside surface of the helmet or on an inside surface of the helmet. The apparatus can further include at least one of a microphone and a speaker. The apparatus can further include an interface to a human interface device. The human interface device can be used to control at least one function of the apparatus. The at least one function of the apparatus can include one of accepting a pop-up alert, switching to a different type of view, and declining an incoming phone call. The hinged attachment of the mounting plate can allow adjustment of a viewing angle of the helmet mounted display up or down around an axis of the hinged attachment.

The latching tabs can be coupled to a planar base on the first portion of the housing. The latching tabs can be movable relative to one another and to the planar base. The latching tabs can be moved by an actuator of the planar base. The actuator can include a first button extending upwards from an upper surface edge of the planar base and a second button extending downwards from a lower surface edge of the planar base. The latching tabs can be spring-loaded such that in a resting state the latching tabs are urged away from one another and away from a central axis of the planar base. Actuating the actuator can move the latching tabs towards each other and towards the central axis of the planar base. The latching tabs can move towards each other and towards the central axis of the planar base upon laterally sliding the planar base into the mounting system. The latch receiver components can include recessed terminals located on either side of a central channel in the mounting rocker. The latching tabs can have a shape corresponding to a shape of the recessed terminals. A forward end of each of the tabs can be tapered allowing for easy insertion into the central channel. A rearward end of each of the tabs can extend perpendicular to a direction of insertion preventing inadvertent removal from the central channel. The latching tabs when urged against one another can have a combined width at a widest point that approaches a width of the central channel in the mounting rocker. Upon reaching a location of the recessed terminals on either side of the central channel, the latching tabs can spring outward away from one another and away from the central axis into the recessed terminals. Actuation of the actuators can remove the latching tabs from the recessed terminals allowing the helmet mounted display to be removed from the mounting system in a lateral direction.

The planar base can further include a pair of opposing alignment flanges located on a first face of the planar base. The alignment flanges can each include a first portion extending outward from the surface of the planar base and a second portion extending perpendicular to the first portion and towards the central axis of the planar base. The second portion can be received within and engaged with corresponding mounting grooves on the mounting rocker. The second portion can slide into the grooves from a lateral location and the helmet mounted display couples with the mounting system.

The above-noted aspects and features may be implemented in systems, apparatus, and/or methods, depending on the desired configuration. The details of one or more variations of the subject matter described herein are set forth in the accompanying drawings and the description below. Features and advantages of the subject matter described herein will be apparent from the description and drawings, and from the claims.

BRIEF DESCRIPTION OF THE DRAWINGS

In the drawings,

FIG. 10A shows the slide mount and the mounting system associated in a first configuration;

FIG. 10B shows the slide mount and the mounting system associated in a second configuration;

DETAILED DESCRIPTION

Figure 1:
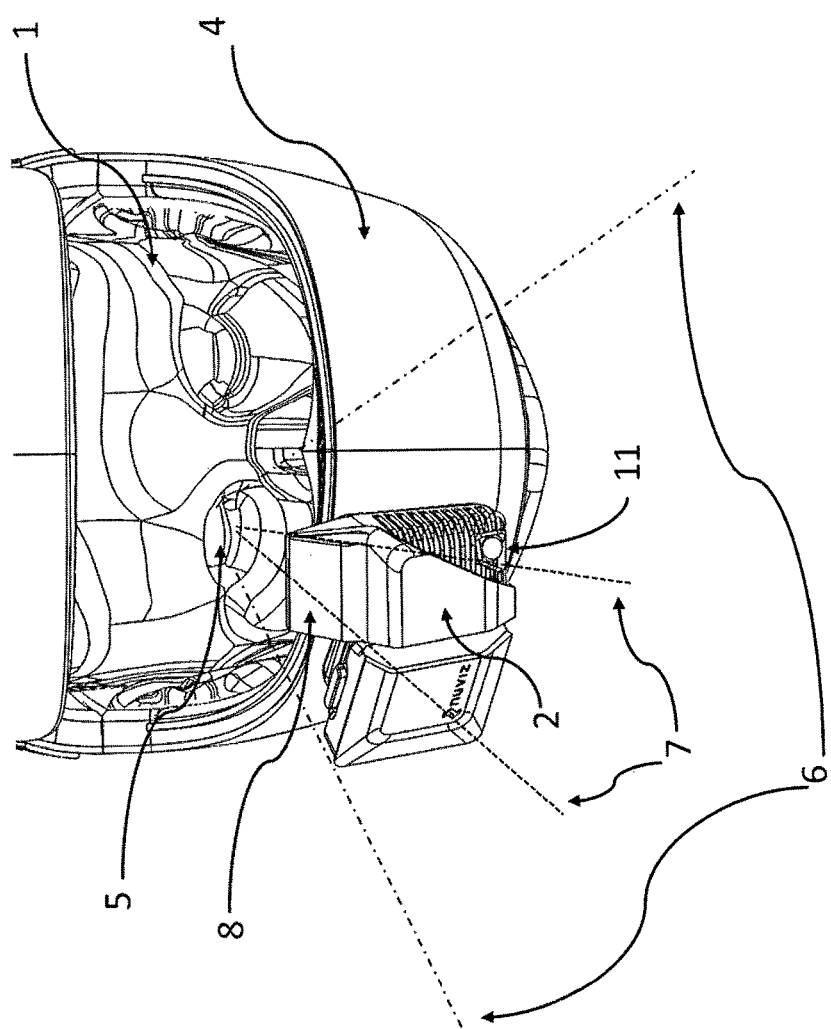
FIG. 1 is a front view of an implementation of a helmet mounted display (HMD) positioned on a helmet.

Past examples of helmet mounted displays for vehicle information, such as those used by fighter pilots, tend to be very expensive, complicated, and an extension of the vehicle computing systems. Described herein are inexpensive stand-alone devices capable of accessing vehicle or internet based data that can be retrofitted to a wide variety of helmet designs. In some implementations, described is a mountable device to any universal helmet including first section, second section and third section and accordingly their connection sections. The first section can have a mounting section (adhesive tape) to the helmet on one side and other side of the first section has a latching mechanism to second section. The connecting section movably connects first and second section. The second section houses one part of electronics as well as battery has a tubular housing member. The third section has the display and second tubular housing member. The connecting section movably connects second and third section.

The devices, apparatus, and systems described herein allow operation of a moveable visor found on many helmets and can be controlled by the rider. Described herein are modular heads up displays for providing information to a wearer of a protective helmet hat are attached to the helmet. The subject matter disclosed herein provides a helmet mounted display apparatus that is modular, removable, and able to provide a wide variety of user interface functions to an operator of a motor vehicle. It should be appreciated that the helmet mounted display apparatus described herein can be used for motorcycle riders, car and truck racing, snow mobile operations, and other including use without a vehicle such as sky diving. The helmet mounted display apparatus described herein can be used with any of a variety of helmets or similar headgear used for any of a variety of reasons.

The apparatus can include mechanical features, which can be form factor adjustable in order to compensate the different geometries of any protective helmet. A helmet mounted display or (HMD) generally includes a transparent, semi-transparent, or opaque display that rests in view of a wearer, a mounting system to allow it to be attached to a helmet, a computing device connected to the display, and an optional wireless or wired transmission capability. The HMD may also include sensors such as an inertial measurement system, a gyroscope, a GPS receiver, a touch sensor, a microphone and a camera. The computing device can generally include a processor, memory, and display driver.

In some implementations, a helmet-mounted display (HMD) is provided that includes a see-through display and sensor systems that provide the device's location, orientation, and bearing (for example, latitude, longitude, altitude, pitch, roll or degree tilt from horizontal and vertical axes, and compass heading). The HMD can be configured as a monocular display that can be mounted in view of either the left or right eye of the wearer. Further, one or more elements of the sensor system can be located on peripheral devices physically separate from the display such as the GPS sensor could be located on a wearer's smart phone and data can be shared between the HMD and the phone.

In interrelated implementations, a helmet-mounted display (HMD) is provided that includes a see-through display, sensor systems, and a data stream adaptor capable of interpreting vehicle data from a CAN bus. The wearer is able to view vehicle data through the HMD that relates to speed, gear position, location, as well as other data reported by the connected CAN Bus devices. The HMD can be configured as a monocular display that can be mounted in view of either the left or right eye of the wearer.

Turning now to the drawings, FIG. 1 is a system level view of an implementation of an apparatus for use with a helmet 4 that may be worn by wearer 1. The apparatus can include a helmet mounted display (HMD) 2 attached to the helmet 4. The HMD 2 can be mounted directly to the chin bar of the helmet 4 or can be attached to another mounting system 3 that is configured to be attached to the helmet 4.

FIG. 1 depicts how the wearer 1 might see the optical element 8 of the HMD 2 extended up above the chin bar of helmet 4 and sit within the wearer's field of view 6, for example of the wearer's right eye 5. The HMD 2 can include an optical element 8 that may be see-through, opaque, or semi-transparent. The optical element 8 preferably allows for the ability to project display data to the wearer 1. While a wearer's full field of view 6 can extend to the extreme limits of the human eye, the HMD optical element 8 can be positioned within the wearers field of view 6 in such a way that the creates a corresponding display field of view 7. All projected images can appear within the display field of view 7.

Figure 2:
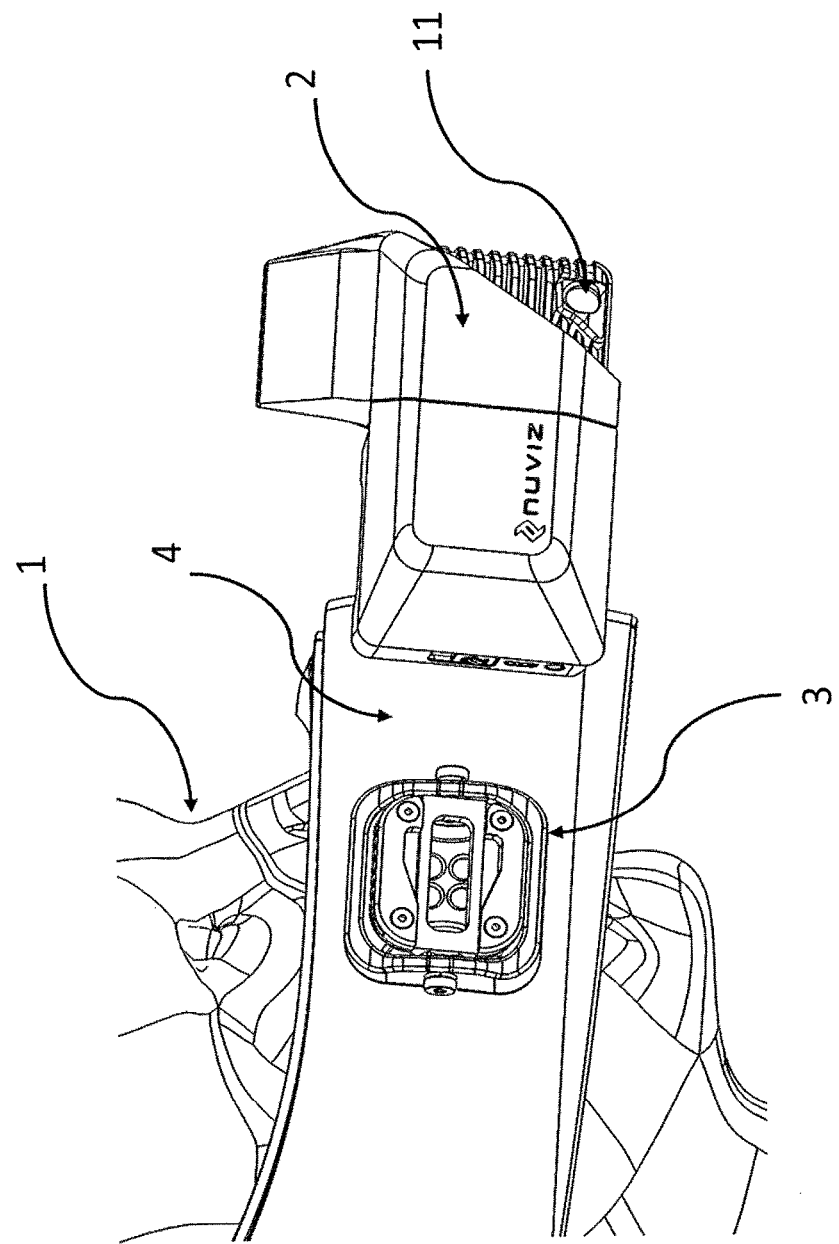
FIG. 2 is a side view of the helmet having a mounting system for mounting the HMD to the helmet.

FIG. 2 provides a side view of the helmet 4 and the HMD 2. In this view, the HMD 2 is not attached directly to the helmet 4 but instead depicts a mounting system 3 affixed to the helmet 4. In one embodiment, the HMD 2 can be mounted to the external surface of the helmet chin bar 4. In this embodiment, the HMD 2 can be positioned such that it does not FIGURE interfere with normal operation of a helmet visor or vent switches (not shown in the). It can be alternatively placed to create display field of view 7 in front of either the right eye 5 by mounting it on the right side of the helmet chin bar 4 or in front of the left eye by mounting it on the left side of the helmet chin bar 4. In this embodiment, the HMD 2 can be attached and removed at will by the wearer 1. Implementations of the mounting system 3 will be described in more detail below.

The HMD 2 can also include one or more processing and sensor subsystems contained within HMD module. By way of example and without limitation, the processor and sensor subsystem can include any one or more of a motion detector (e.g., a gyroscope and/or an accelerometer), a camera 11, a microphone 35 (FIG. 3), a location determination device (e.g., a GPS device, a NFC reader), a magnetometer, and/or an orientation sensor (e.g., a theodolite, infra-red sensor) a processing system on a chip, a wireless networking capability, and a display driver.

Figure 3:
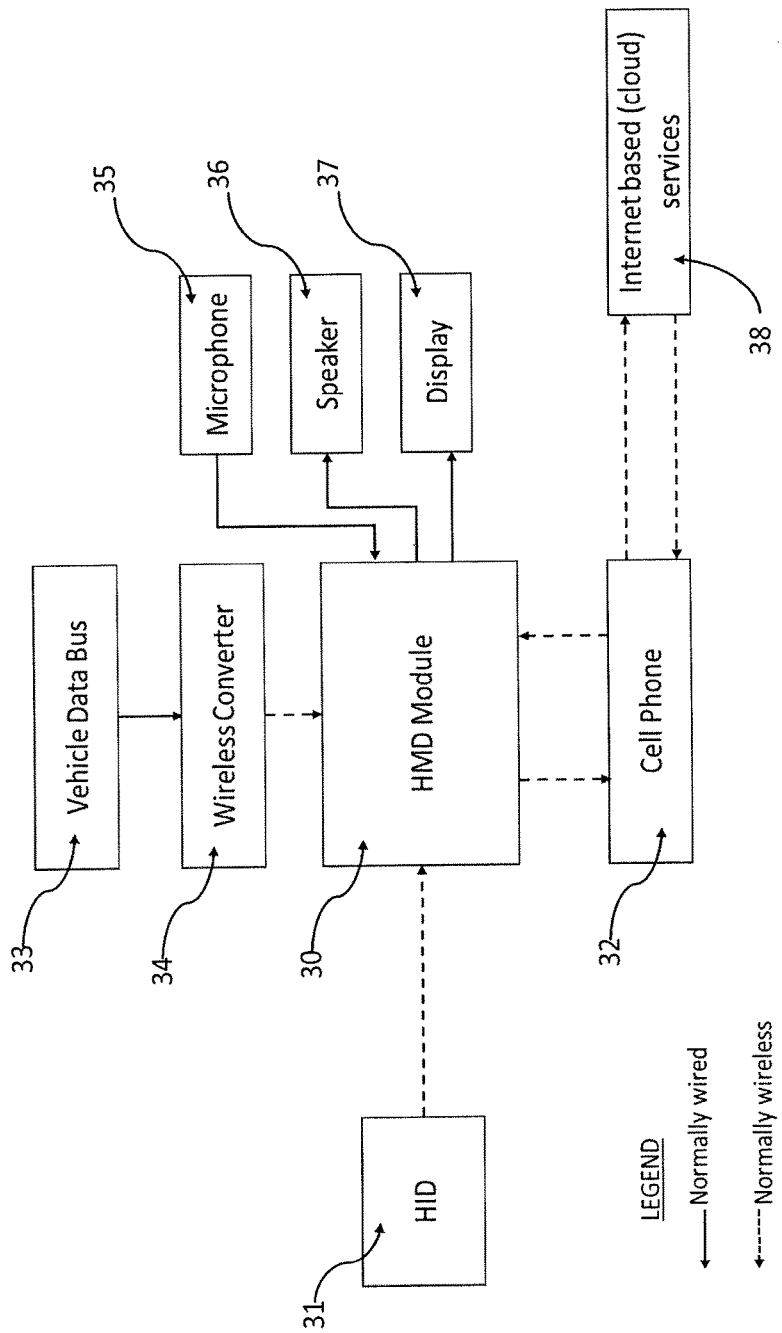
FIG. 3 shows a network diagram of an HMD module.

FIG. 3 shows a network diagram of an HMD processing module 30 of the HMD 2 connected to a variety of attached input and output devices. This diagram represents a number of different configurations that highlight the flexibility of the modular HMD design in vehicle and even non-vehicle applications. The HMD 2 can be connected either wirelessly or through a wire to other devices—these interfaces. The display 37, microphone 35, and speaker 36 are shown as a separate boxes from the HMD Module 30 only to clearly depict the data flow. Unlike the background example of a fighter pilot helmet, many civilian uses of helmet mounted display technologies may involve navigation, connectivity to a cell phone for calling and receiving text messages, filming first person point of view videos, or viewing vehicle data. The video can be recorded from a camera 11. To accomplish these activities, the HMD may connect to a cell phone 32 through standard data sharing techniques such as tethering. Tethering may be accomplished many different ways, two such methods are via Bluetooth or Wi-Fi communication. The cell phone 32 can be a gateway that allows the HMD 2 to access remote data sources such as Internet based cloud services 38 such as for weather data or navigation.

In one embodiment, the user may want to control the HMD 2 via a wirelessly or wired human input device (HID) 31. An example of this would be a motorcycle rider having a handlebar mounted collection of buttons that may control elements of the HMD's user interface such as accepting a pop-up alert, switching to a different type of view, or declining an incoming phone call.

In another embodiment, the wearer 1 can view vehicle data through the HMD 2 that relates to speed, gear position, location, as well as other data reported through a bus 33, such as a controller area network (CAN) bus 33 or other like bus. This can be accomplished through a CAN Bus converter that can be attached to a vehicles CAN Bus 33. The converter 34 can then read and send the serial data to the HMD module 30 where software running on the HMD 2 interprets and then displays the data to the user via the display 37. The HMD 2 may also be able to receive spoken commands from the user through the attached microphone 35. It may, in some embodiments, play sounds to the user through an attached speaker 36.

Figure 4:
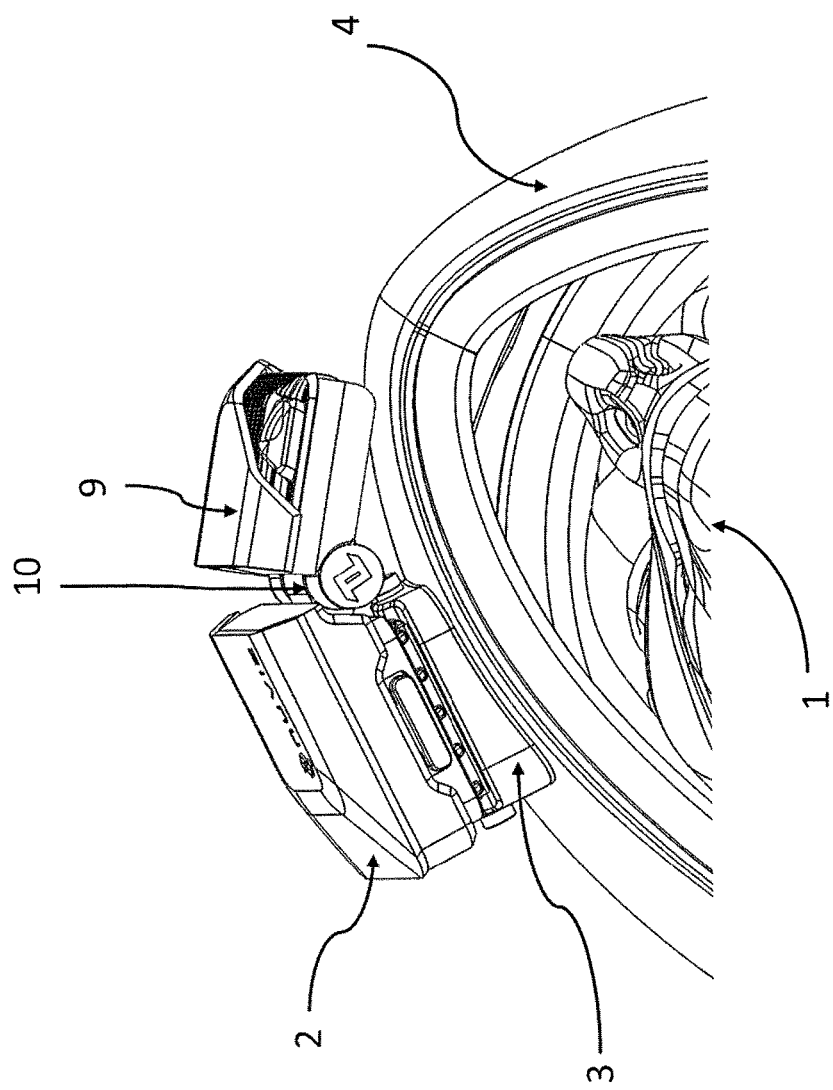
FIG. 4 shows a top-down view of an implementation of an HMD mounted to the chin bar of a helmet with an optical element housing rotated to align with the wearer's vision.
Figure 5:
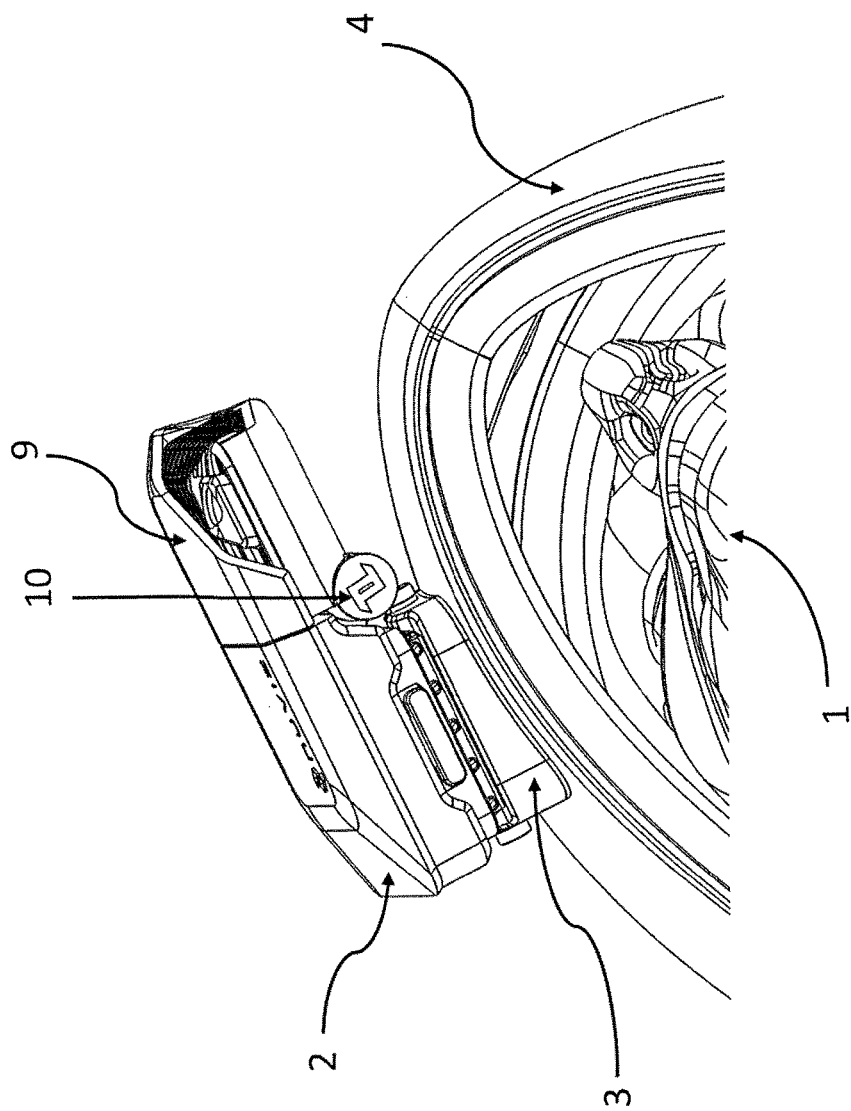
FIG. 5 shows a top-down view of the HMD mounted to the chin bar of the helmet with the optical element housing not rotated.

Due to the variability in head shape, inter-pupillary distance, and helmet geometry, the devices described herein provide some degree of configurability and adjustability. For example, at least a portion of the HMD can rotate or pivot relative to the wearer. FIG. 4 shows an implementation of an HMD 2 mounted to the chin bar of the helmet 4. The optical element 8 can be housed by an optical element housing 9 configured to rotate around hinge 10 to align the optical element 8 with the wearer's field of vision. Thus, the optical element 9 housed by the optical element housing 9 can move relative to another portion of the HMD 2. In this embodiment, that HMD 2 can be adjusted in such a way that the entire body is aligned for optimal viewing, or just the optical element 8 portion of the HMD 2 can be adjusted and/or aimed, for example rotated around hinge 10. FIG. 5 shows the optical element housing 9 of FIG. 4 having hinge 10 where the optical element housing 9 is aligned with the remainder of the housing of the HMD 2. The degree of rotation around the hinge 10 can vary as desired by the user, for example, due to the wearer's head shape or helmet geometry.

Figure 6A:
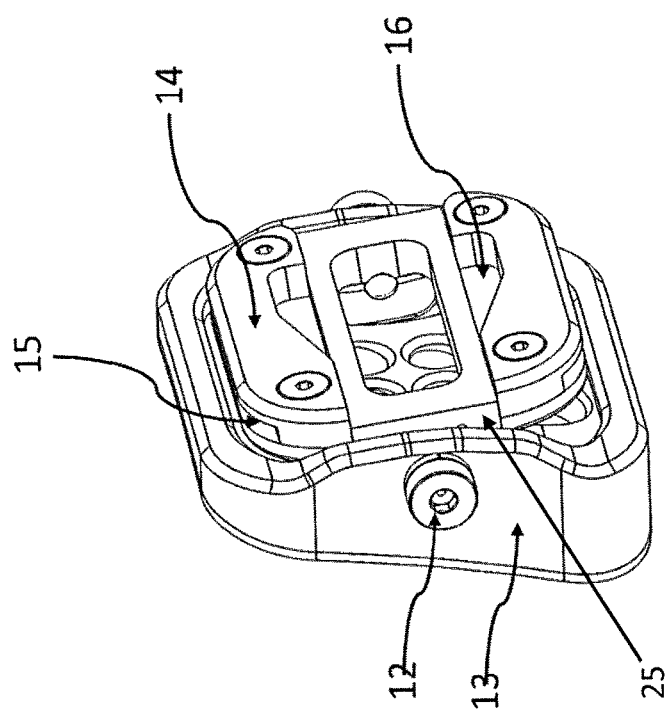
FIG. 6A shows an implementation of a mounting system for the HMD.

As mentioned above, the HMD assembly 2 can be coupled to the helmet 4 via a mounting system 3. One face of the mounting system 3 can be coupled to the HMD 2 and an opposite face of the mounting system 3 can be coupled to the helmet 4. The coupling mechanisms for attaching the HMD 2 to the mounting system 3 and the mounting system 3 to the helmet 4 can vary. FIG. 6A depicts an implementation of the mounting system 3 for use with the HMD 2. The mounting system 3 can include a mounting plate 13. A first surface of the mounting plate 13 can be configured to adhere or otherwise couple to a region of the helmet 4. In some implementations, the first surface of the mounting plate 13 can be coupled to an external surface of the helmet 4. In other implementations, the first surface of the mounting plate 13 can be coupled to an internal surface of the helmet 4 as will be described in more detail below. The first surface of the mounting plate 13 can be adhered to the helmet 4, for example, by applying an adhesive such as VHB tape or an adhesive pad 17 (see FIG. 7).

The mounting system 3 can also include a mounting rocker 14 coupled to the mounting plate 13 via one or more hinge screws 12. The mounting plate 13 can have a surface opposite the surface configured to couple to the helmet 4 that is shaped to receive at least a portion of the mounting rocker 14. The mounting rocker 14 can be a generally planar element that lies within at least a portion of a cavity of the mounting plate 13. The hinge screws 12 can extend at least in part through a central portion of the mounting rocker 14 such that the mounting rocker 14 can pivot around the screws 12 within the cavity of the mounting plate 13. The mounting plate 13 and mounting rocker 14 can have a relatively low profile such that the mounting system 3 provides for an efficient and visually appealing coupling between the helmet 4 and the HMD 2. The mounting rocker 14 can allow for the viewing angle of the HMD 2 to be adjusted up or down around the axis of the hinge screws 12. Thus, the HMD 2 can be adjusted around at least a first axis via the hinge 10 and around at least a second axis via the hinge screws 12 for further adjustment of the HMD 2 position on the helmet 4.

Figure 6B:
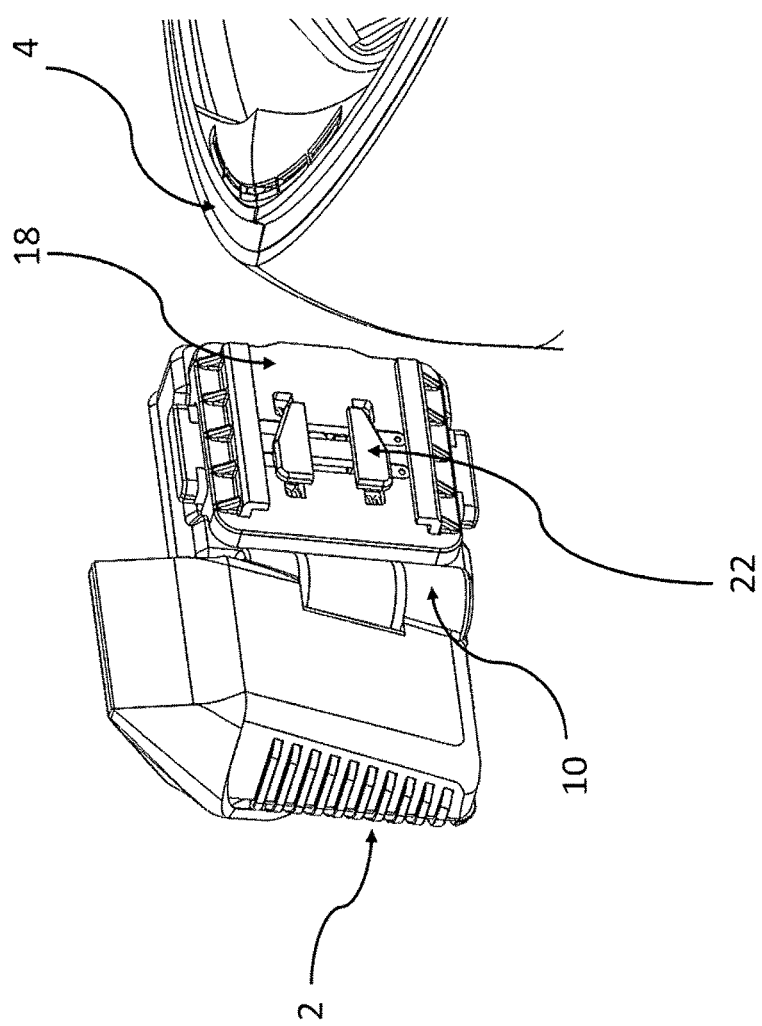
FIG. 6B shows an implementation of a slide mount from the reverse view of FIG. 1.
Figure 7:
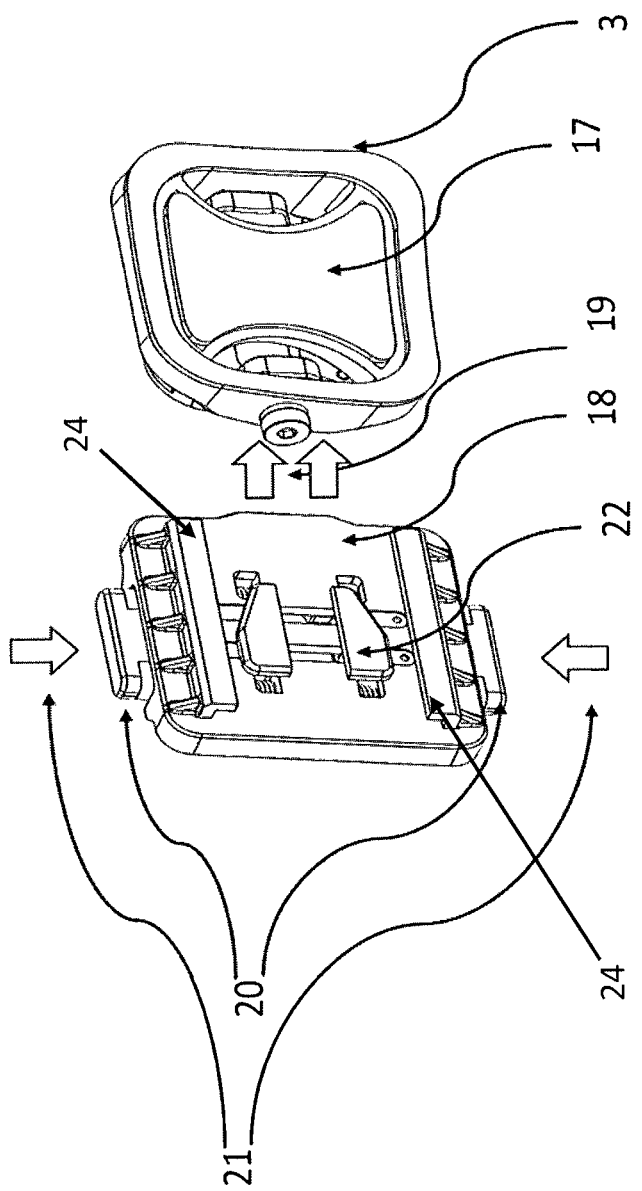
FIG. 7 shows the slide mount being aligned with the mounting system from FIG. 6A in a first configuration.
Figure 8:
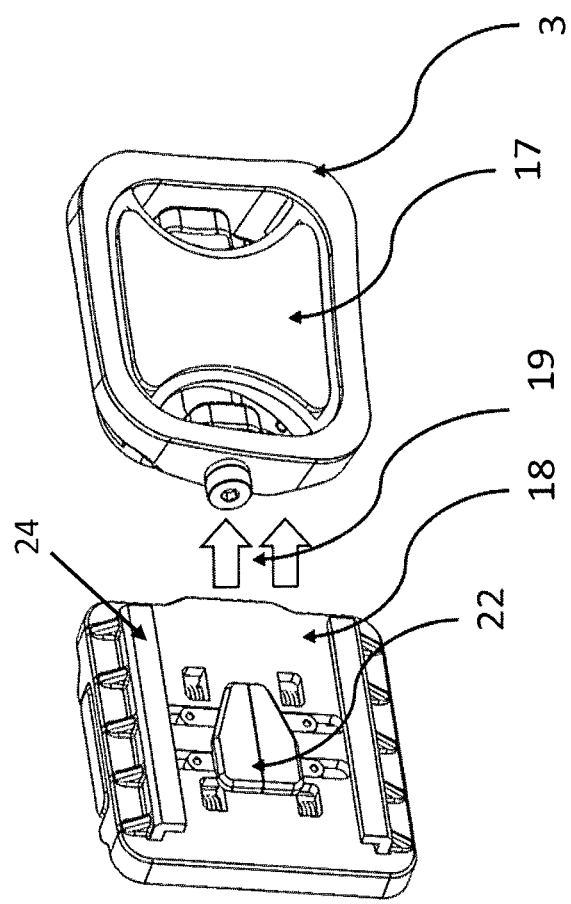
FIG. 8 shows the slide mount of FIG. 7 in a second configuration.

Still with respect to FIG. 6A, the mounting system 3 can further include one or more latch receiver components 16 for mounting and removal of the HMD 2. The one or more latch receiver components 16 can be recessed terminals located on either side of a recessed central channel 25 in the mounting rocker 14. Corresponding elements on a slide mount 18 of the HMD 2 are configured to be received within the one or more latch receiver components 16 as will be described in more detail below. FIGS. 7 and 8 show the elements of the slide mount 18 in a first and a second configuration, respectively. FIG. 6B shows the HMD 2 from the reverse view of FIG. 2 and as part of the HMD assembly. The slide mount 18 can include a relatively planar base having a first face on which opposed latching tabs 22 can be positioned. The opposed latching tabs 22 can be movable relative to one another and to the slide mount 18 by an actuator. The actuator can include any of a number of actuator types. In some implementations, the actuator includes one or more buttons 20. The buttons 20 can be positioned relative to the planar base of the slide mount such that a first button 20 extends upwards from an upper surface edge of the planar base and a second button 20 extends downwards from a lower surface edge of the planar base of the slide mount 18 such that the two opposing buttons 20 can be squeezed towards one another to slide the opposed latching tabs 22 together. The buttons 20 can be coupled to the latching tabs 22 directly or indirectly. The buttons 20 and latching tabs 22 can also be combined into a single, unitary part.

Figure 9:
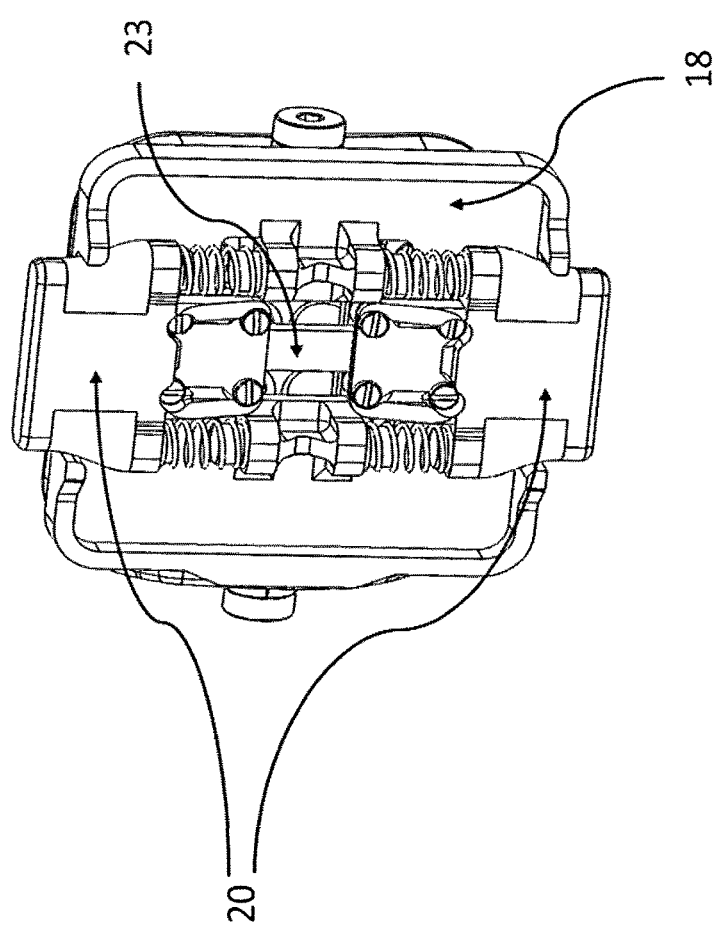
FIG. 9 shows a reverse side of the slide mount of FIG. 7.

FIG. 9 shows a reverse side view of the slide mount 18 having a planar body that can support buttons 20. The latching tabs 22 and/or their associated buttons 20 can be spring-loaded such that in a resting state the latching tabs 22 are urged away from one another by one or more springs 23 (see FIG. 7, FIG. 9, and FIG. 10A). The buttons 20 and the one or more springs 23 can be oriented in such a way that the springs 23 push the buttons 20 in an outward direction away from the center of the slide mount 18. For example, the one or more springs 23 can be positioned on a second, opposite face of the planar base of the slide mount 18. The one or more springs 23 can be wedged between flanged elements on the second face such that upon movement of the buttons 20 towards each other and a central axis or central region of the slide mount 18, the springs 23 are compressed between the flanged elements. To move the latching tabs 22 towards one another, a user can depress the buttons 20 in the direction of the arrows 21 (see FIG. 10B). Alternatively, the latching tabs 22 can be moved towards one another by sliding the slide mount 18 laterally into the mounting system 3 as will be described in more detail below. Upon release of compression of the buttons 20, the springs 23 can expand to urge the buttons 20 and the associated latching tabs 22 away from one another and away from the central axis A of the planar base of the slide mount 18. As mentioned above, the buttons 20 can be coupled to or integrated with the latching tabs 22 positioned on the first face of the slide mount planar base. The planar base of the slide mount 18 can include one or more slots extending therethrough such that the latching tabs 22 coupled to or integrated with the buttons 20 can undergo reciprocating movement as the buttons 20 are depressed and released.

Once buttons 20 are depressed, the HMD 2 can slide along the one or more mounting grooves 15 of the mounting rocker 14 (best shown in FIG. 6A). It should be appreciated that the buttons 20 need not be depressed in order to slide the HMD 2 into association with the mounting system 3. For example, the act of sliding the mount 18 into the mounting rocker 14 of the mounting system 3 can cause the latching tabs 22 to move towards one another. Again with respect to FIG. 7, the HMD 2 can slide laterally relative to the rocker 14 from a first end region towards a second end region, for example, in the direction of the sliding arrows 19. The HMD 2 can slide until latching tabs 22 engage within the latch receiver 16 of the mounting system 3.

In some implementations each of the latching tabs 22 can have a forward end that is tapered such that as the slide mount 18 is moved further in a lateral direction along arrows 19 the forward ends of the latching tabs 22 enter the central channel 25 of the mounting rocker 14. The tapered shape of the latching tabs 22 can allow for a smooth sliding transition of the latching tabs 22 into the central channel 25, which can urge the tabs 22 further towards one another. The latching tabs 22 when urged against one another can have a combined width at their widest point that approaches the width of the recessed central channel 25 in the mounting rocker 14 such that the latching tabs 22 together can slide through the channel 25. Upon reaching the location of the latch receiver components 16 on either side of the recessed central channel 25, the spring-mounted latching tabs 22 can spring outward away from one another (e.g. in a direction opposite arrows 21 in FIG. 7) snapping into their respective recessed terminals of the latch receiver components 16. Thus, the latching tabs 22 can also have a shape corresponding to a shape of the latch receiver components 16 such that when they move outward away from one another they can be received within the latch receiver components 16. The latching tabs 22 and recessed terminals can be a variety of shapes having varying dimensions, but generally the shape and dimension corresponds to one another. In some implementations, the latching tabs 22 (and thus, corresponding recessed terminals) can have a triangular shape such that a forward end of the latching tab is tapered to form an acute angle with the central axis A of the planar base and a rearward end of the latching tab extends perpendicular to the central axis of the planar base.

The slide mount 18 can also include an opposing pair of alignment flanges 24 located on the first face of the slide mount 18 (best shown in FIGS. 7 and 8). The alignment flanges 24 can be formed by a first portion extending outward from the surface of the planar base and a second portion extending perpendicular to the first portion and towards the center of the planar base. The second portion of the alignment flanges 24 can be received within and engaged with corresponding mounting grooves 15 located, for example, on upper and lower external surfaces of the mounting rocker 14 (best shown in FIG. 6A) such that the HMD 2 slide mount 18 can slide into the mounting system 3 from a lateral location. The alignment flanges 24 of the slide mount 18 and the grooves 15 of the mounting rocker 14 as well as the association between the latching tabs 22 of the slide mount 18 and the receiver components 16 of the mounting rocker 14 provide for a rigid and reversible fixation of the HMD 2 in the mounting system 3.

The relative shapes of the tabs 22 and the receiver components 16 provide for an easy association in the direction of insertion (arrows 19) and prevent inadvertent removal of the tabs 22 from the receiver components 16 in a direction opposite of insertion. For example, the forward end of each of the tabs 22 can be tapered allowing for easy insertion into the central channel 25 in the direction of arrows 19. The rearward end of each of the tabs 22 can be squared off such that the surface extends perpendicular to the direction of insertion. This can result in the rearward end of each of the tabs 22 abutting against corresponding surfaces of the receiver components 16 thereby preventing inadvertent removal of the tabs 22 from the receiver components 16 in a direction opposite of insertion. The HMD 2 can be removed from the mounting system 3 by depressing the spring-loaded buttons 20 such that the latching tabs 22 are urged towards one another and out from the latch receiver components 16. This allows for the HMD 2 to be slid in the reverse direction (i.e. opposite arrows 19) and out of association with the mounting system 3. Thus, the buttons 20 can act as a release mechanism when the HMD is desired to be removed from the mounting system 3 and released from the helmet 4.

Figure 11A:
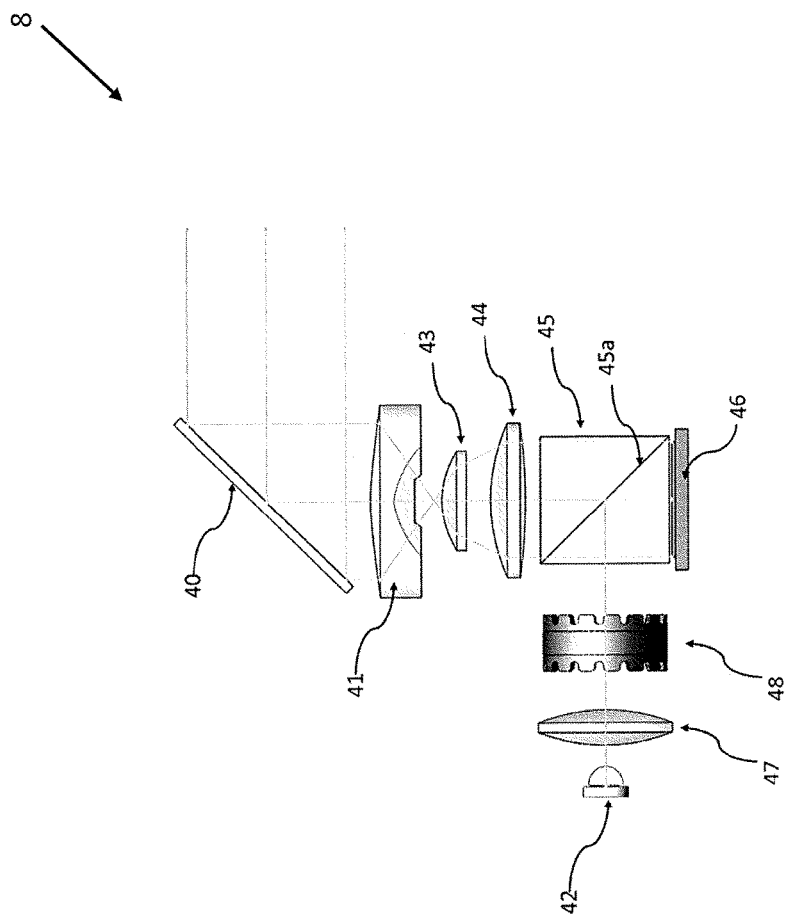
FIGS. 11A and 11B show 2-D views of the elements of the optical pathway of the HMD.
Figure 11B:
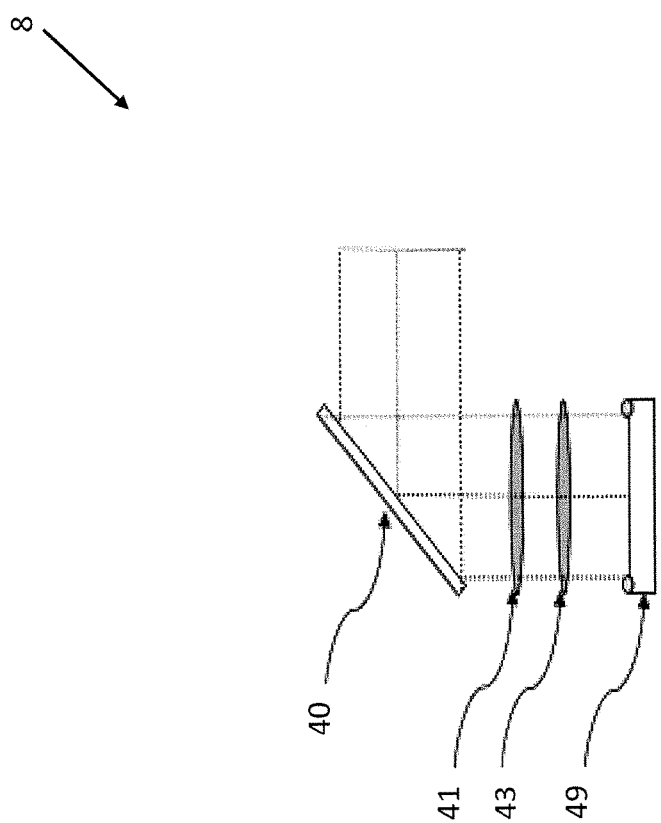
Figure 12:
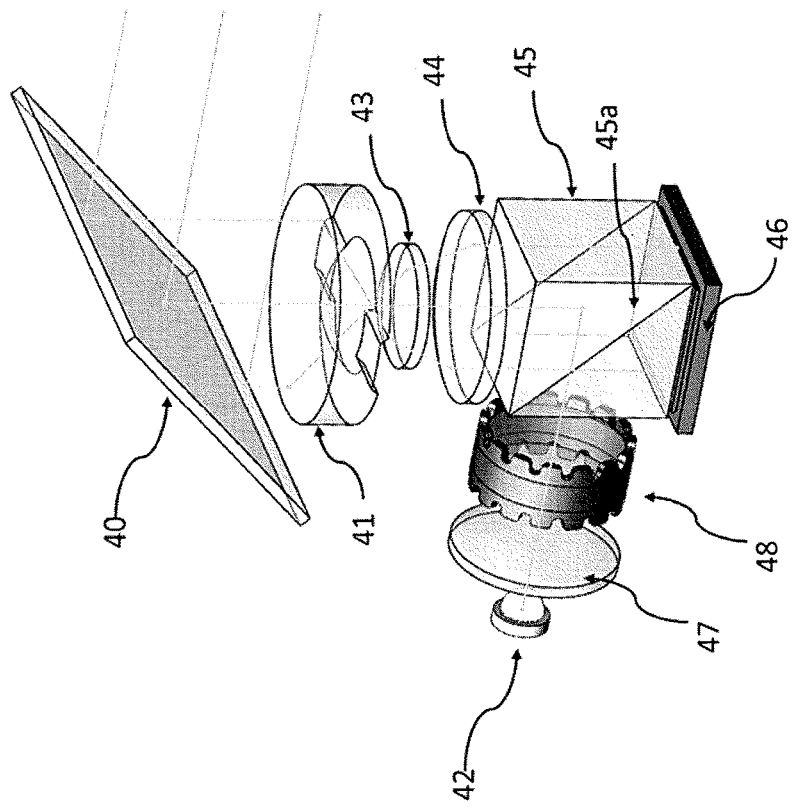
FIG. 12 shows a perspective view of the elements of the optical pathway depicted in FIGS. 11A-11B.

FIGS. 11A-11B show 2-D schematic views of an implementation of the optical element 8 of the HMD 2. FIG. 11A shows a 2-D view of the illumination and expansion optics used to project the image from the surface of the microdisplay 46 to the combiner surface 40. Light can be emitted from an LED 42 which can be then collimated in a collimator 47 before passing through the polarization conversion system 48 which polarizes the incident light prior to being reflected by a Polarizing Beam Splitter 45 having a polarizing beam splitter surface 45a onto the microdisplay surface 46. The image from the microdisplay 46 can then pass back through the Polarizing Beam Splitter 45 and be expanded and focused at the desired distance by a series of lenses 41, 43, 44. The image can be reflected off the combiner surface 40 towards the user's eye. FIG. 11B shows a 2-D view of an interrelated implementation an optical pathway 8 of the HMD 2 using front LED microdisplay 49 simplifying the optical design. In either implementation shown in FIG. 11A and FIG. 11B, the combiner surface 40 can contain a polarizing element which reduces the impact of ambient light. FIG. 12 shows a perspective 3-D view of the elements of the optical pathway 8 depicted in FIG. 11A and the illumination and expansion optics used to project the image from the surface of the microdisplay 46 to the combiner surface 40. As discussed above, light can be emitted from one or more LEDs 42 that can be embedded to the microdisplay module. The image from microdisplay 46 can pass through lenses 44, 43, 41 to the combiner surface 40 towards the user's eye.

Figure 13:
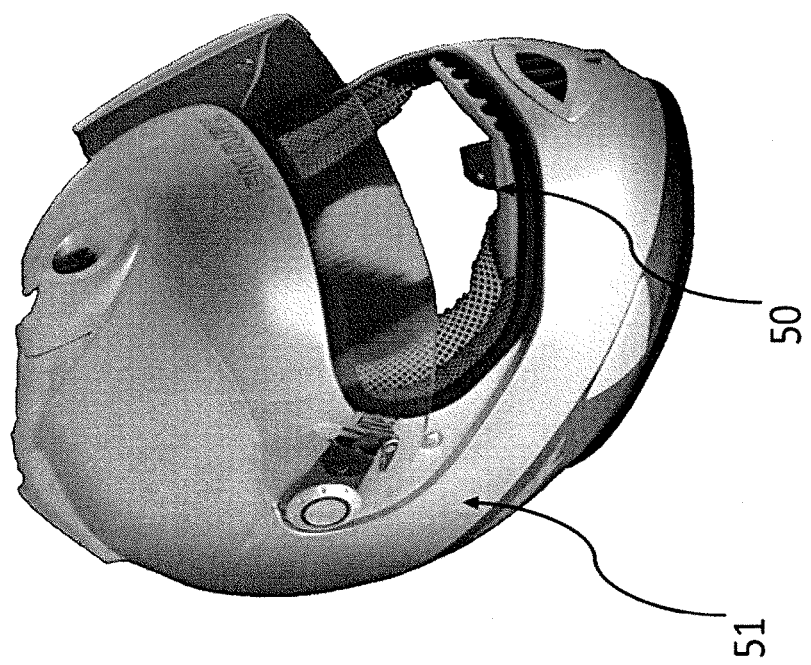
FIG. 13 shows an interrelated implementation of an HMD for use with a full face helmet.

In some implementations, a wearer may prefer to mount the HMD closer to their eye. Thus, the HMD can be mounted within a space or cavity inside the wearer's helmet. FIG. 13 shows a full face helmet 51 with a cavity sized to allow internal mounting of a removable HMD module 50 below the wearer's eye. The embodiment shows the HMD module 50 is mounted inside a cavity of a full face helmet 51. The size of the cavity can vary, but generally is configured to receive the HMD 50. In this embodiment, the module 50 is mounted inside the chin bar of the helmet 51 with the optical element extending upwards towards the users face. In this embodiment, the display field of view is then created below the wearer's eye. It is envisioned that this allows for the removal and reattaching of the HMD module 50. It also allows the transfer between helmets that have a compatible mounting cavity.

Figure 14:
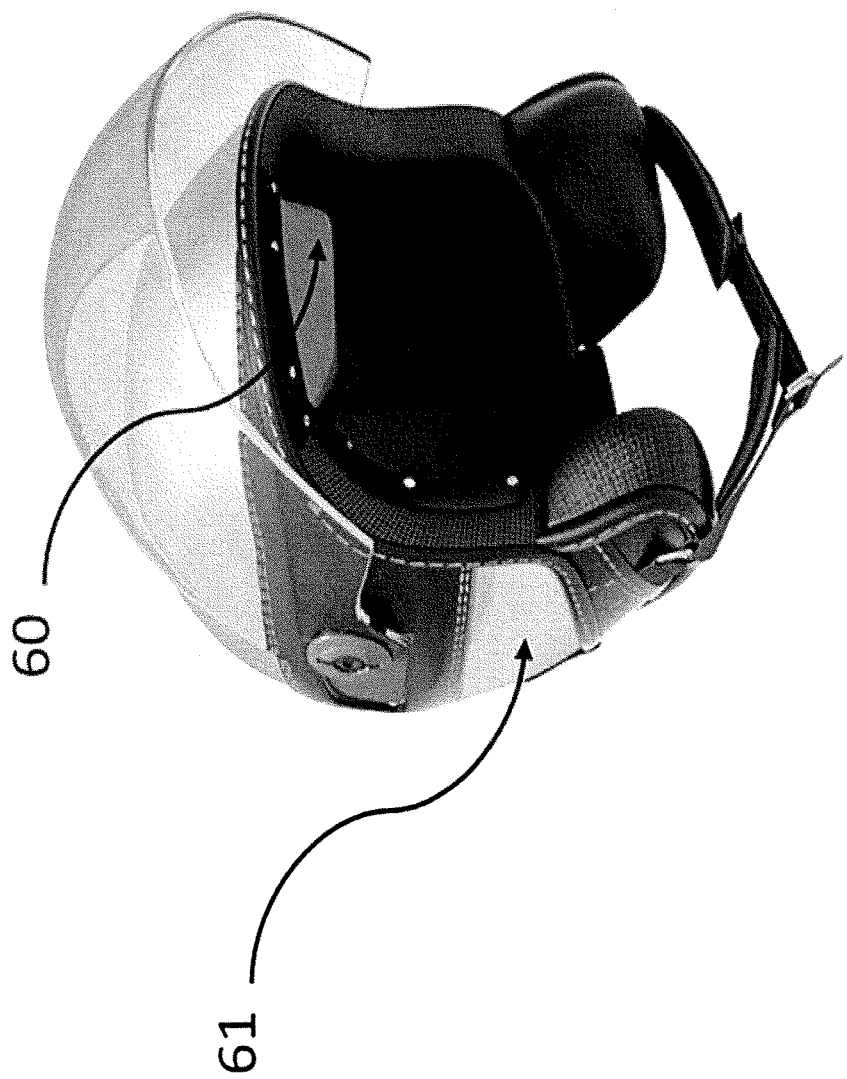
FIG. 14 shows an interrelated implementation of an HMD for use with a non-full face helmet.

FIG. 14 shows a non-full face helmet 61 with a cavity to allow internal mounting of a removable HMD module 60 above the wearer's eye. A properly sized cavity can be included that allows for internal mounting of a removable HMD module 60. In this embodiment, the module 60 is mounted in the upper part of the helmet 61 with the optical element extending downwards towards the users face. In this embodiment, the display field of view is then created above the wearer's eye. This embodiment may be useful when there is no available chin bar to mount to.

While this specification contains many specifics, these should not be construed as limitations on the scope of what is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results. Only a few examples and implementations are disclosed. Variations, modifications and enhancements to the described examples and implementations and other implementations may be made based on what is disclosed.

The subject matter described herein may be embodied in systems, apparatus, methods, and/or articles depending on the desired configuration. For example, the systems, apparatus, methods, and/or articles described herein can be implemented using one or more of the following: electronic components such as transistors, inductors, capacitors, resistors, and the like, a processor executing program code, an application-specific integrated circuit (ASIC), a digital signal processor (DSP), an embedded processor, a field programmable gate array (FPGA), and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean, "based at least in part on," such that an unrecited feature or element is also permissible.

What is claimed:
1. An apparatus comprising:
   a mounting system comprising:
      a mounting plate configured for attachment to a helmet;
      a mounting rocker having a hinged attachment to the mounting plate, the mounting rocker including latch receiver components; and a helmet mounted display separate from the mounting system, the helmet mounted display comprising:

a housing;

latching tabs located on the housing, the latching tabs detachably attachable to the latch receiver components of the mounting rocker from the mounting system;

an optical element comprising a combiner surface, wherein the optical element is housed within the housing;

at least one processor; and at least one memory including software, the at least one memory and software configured to, with the at least one processor, cause the apparatus at least to display heads up information on the combiner surface, wherein the apparatus is configured such that the combiner surface is positionable within the field of view of a wearer of the helmet.

2. The apparatus of claim 1, wherein the optical element further comprises at least one light emitting diode backlight, at least one lens, at least one polarizing beam splitter, at least one collimator, at least one polarization conversion system and at least one microdisplay surface.

3. The apparatus of claim 1, wherein the at least one processor and at least one memory including software are further configured to receive the heads up information from at least one of a cell phone and a vehicle data bus.

4. The apparatus of claim 1, wherein the heads up information comprises at least one of navigation information, weather information, text messages, and vehicle data.

5. The apparatus of claim 1, further comprising a camera, wherein the apparatus is configured to record video from the camera.

6. The apparatus of claim 1, wherein the mounting plate is mounted on an outside surface of the helmet.

7. The apparatus of claim 1, wherein the mounting plate is mounted on an inside surface of the helmet.

8. The apparatus of claim 1, further comprising at least one of a microphone and a speaker.

9. The apparatus of claim 1, further comprising an interface to a human interface device, wherein the human interface device is used to control at least one function of the apparatus.

10. The apparatus of claim 9, wherein the at least one function of the apparatus comprises one of accepting a pop-up alert, switching to a different type of view, and declining an incoming phone call.

11. The apparatus of claim 1, wherein the hinged attachment of the mounting plate allows adjustment of a viewing angle of the helmet mounted display up or down around an axis of the hinged attachment.

12. The apparatus of claim 1, wherein the latching tabs are coupled to a planar base on the first portion of the housing, wherein the latching tabs are movable relative to one another and to the planar base.

13. The apparatus of claim 12, wherein the latching tabs are moved by an actuator of the planar base.

14. The apparatus of claim 13, wherein the actuator comprises a first button extending upwards from an upper surface edge of the planar base and a second button extending downwards from a lower surface edge of the planar base.

15. The apparatus of claim 14, wherein the latching tabs are spring-loaded such that in a resting state the latching tabs are urged away from one another and away from a central axis of the planar base.

16. The apparatus of claim 15, wherein actuating the actuator moves the latching tabs towards each other and towards the central axis of the planar base.

17. The apparatus of claim 16, wherein the latching tabs move towards each other and towards the central axis of the planar base upon laterally sliding the planar base into the mounting system.

18. The apparatus of claim 17, wherein the latch receiver components comprise recessed terminals located on either side of a central channel in the mounting rocker.

19. The apparatus of claim 18, wherein the latching tabs have a shape corresponding to a shape of the recessed terminals.

20. The apparatus of claim 19, wherein a forward end of each of the latching tabs is tapered allowing for easy insertion into the central channel.

21. The apparatus of claim 20, wherein a rearward end of each of the latching tabs extends perpendicular to a direction of insertion preventing inadvertent removal from the central channel.

22. The apparatus of claim 21, wherein the latching tabs when urged against one another have a combined width at a widest point that approaches a width of the central channel in the mounting rocker.

23. The apparatus of claim 22, wherein upon reaching a location of the recessed terminals on either side of the central channel, the latching tabs spring outward away from one another and away from the central axis into the recessed terminals.

24. The apparatus of claim 23, wherein actuation of the actuators removes the latching tabs from the recessed terminals allowing the helmet mounted display to be removed from the mounting system in a lateral direction.

25. The apparatus of claim 23, wherein the planar base further comprises a pair of opposing alignment flanges located on a first face of the planar base.

26. The apparatus of claim 25, wherein the alignment flanges each include a first portion extending outward from the surface of the planar base and a second portion extending perpendicular to the first portion and towards the central axis of the planar base.

27. The apparatus of claim 1, wherein the mounting plate comprises a first face configured for attachment to the helmet; and a second face configured for attachment to the mounting rocker, wherein the first face is positioned opposite the second face.

28. The apparatus of claim 1, wherein the latch receiver components define openings configured to receive the latching tabs.

* * * * *